United States Patent
Lai

(10) Patent No.: US 9,696,516 B2
(45) Date of Patent: Jul. 4, 2017

(54) VEHICLE REPAIR HAND TOOL

(71) Applicant: TRISON GLOBAL COMPANY LIMITED, Taichung (TW)

(72) Inventor: Yin-Wu Lai, Taichung (TW)

(73) Assignee: TRISON GLOBAL COMPANY LIMITED, Taichung (TW)

( * ) Notice: Subject to any disclaimer, the term of this patent is extended or adjusted under 35 U.S.C. 154(b) by 2 days.

(21) Appl. No.: 14/490,419

(22) Filed: Sep. 18, 2014

(65) Prior Publication Data

US 2016/0082581 A1    Mar. 24, 2016

(51) Int. Cl.
| | |
|---|---|
| G02B 7/182 | (2006.01) |
| B25G 3/38 | (2006.01) |
| B25J 15/04 | (2006.01) |
| B25J 1/04 | (2006.01) |
| F21L 14/02 | (2006.01) |
| A47G 1/16 | (2006.01) |
| B25G 1/04 | (2006.01) |
| B25J 1/00 | (2006.01) |

(Continued)

(52) U.S. Cl.
CPC .............. G02B 7/182 (2013.01); A47G 1/16 (2013.01); B25G 1/04 (2013.01); B25G 3/38 (2013.01); B25J 1/00 (2013.01); B25J 1/04 (2013.01); B25J 15/0416 (2013.01); B25J 15/0608 (2013.01); F21L 14/02 (2013.01); F21V 33/0084 (2013.01); G02B 7/1822 (2013.01)

(58) Field of Classification Search
CPC ...... G02B 7/182; G02B 23/2476; G02B 5/08; G02B 7/198; F16B 2/12; F16B 2/065; B25G 3/00; B25G 1/04; B25G 1/00; B25G 3/36; B25G 3/10; Y10T 16/469; Y10T 16/4719; Y10T 29/49826; Y10T 16/473; Y10T 403/68; Y10T 29/49913; B25B 11/002; B25F 1/02; B25F 1/00; B25F 1/04; B25J 1/00; B25J 1/02; B25J 15/0608; F21V 33/0084; B23B 31/1071
USPC ........ 359/879, 881, 882, 841, 903; 248/467, 248/476, 477, 479, 481, 485, 486; 362/135, 138, 139, 142, 144; 279/77
See application file for complete search history.

(56) References Cited

U.S. PATENT DOCUMENTS

| | | | | |
|---|---|---|---|---|
| 5,951,142 A | * | 9/1999 | Wang | ............ F21V 33/0084 362/109 |
| 6,755,423 B2 | * | 6/2004 | Chiu | .................. B23D 51/10 279/22 |

(Continued)

*Primary Examiner* — Thomas K Pham
*Assistant Examiner* — Alberto Betancourt
(74) *Attorney, Agent, or Firm* — Birch, Stewart, Kolasch & Birch, LLP

(57) ABSTRACT

A vehicle repair hand tool has a handle, a connecting rod, a connecting unit and a working unit. The connecting rod is connected with the handle. The connecting unit is connected with the connecting rod and has an engagement hole. The working unit is connected with the connector and has a base, an engagement unit and a working body. The base has a sliding recess and a recess opening formed in a bottom of the sliding recess. The engagement unit is mounted in the sliding recess and has a sliding block slidably mounted in the sliding recess. The engagement unit further has an engagement ball mounted in the recess opening, sheltered by the sliding block, and selectively engaged in the engagement hole. The working body is mounted on the base.

10 Claims, 8 Drawing Sheets

(51) Int. Cl.
*F21V 33/00* (2006.01)
*B25J 15/06* (2006.01)

(56) References Cited

U.S. PATENT DOCUMENTS

| | | | | |
|---|---|---|---|---|
| 6,920,810 | B1 * | 7/2005 | Thompson | B25B 23/0035 |
| | | | | 279/38 |
| 6,966,562 | B1 * | 11/2005 | Wienhold | B23B 31/1071 |
| | | | | 279/155 |
| 8,690,376 | B2 * | 4/2014 | Coleman | G01N 21/8806 |
| | | | | 362/119 |
| 2012/0074654 | A1 * | 3/2012 | Lai | B23D 51/10 |
| | | | | 279/77 |
| 2013/0167694 | A1 * | 7/2013 | Shih | B25G 1/02 |
| | | | | 81/489 |

* cited by examiner

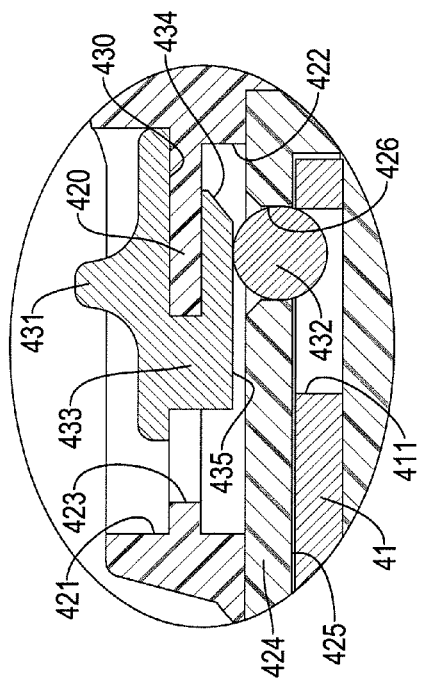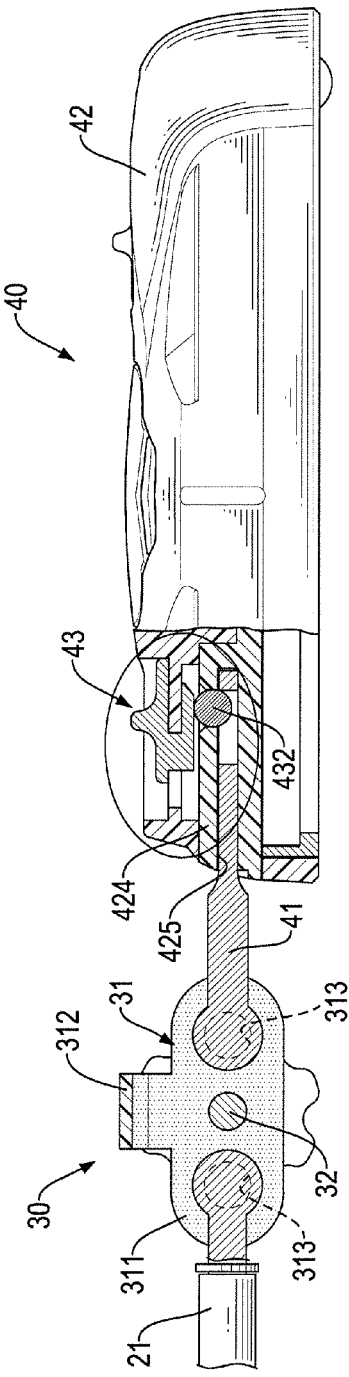
FIG.4A
FIG.4

VEHICLE REPAIR HAND TOOL

BACKGROUND OF THE INVENTION

1. Field of the Invention

The present invention relates to a vehicle repair device, and more particularly to a vehicle repair hand tool.

2. Description of Related Art

With reference to FIG. 8, a conventional vehicle repair hand tool has a handle 60, a connecting unit 70 and a working unit 80. The working unit 80 is connected with the handle 60 by the connecting unit 70. The working unit 80 may be a mirror. The connecting unit 70 has two clamping boards 71 and a fixing bolt 72. The handle 60 has a handle universal joint 61, and the working unit 80 has a working universal joint 81. The clamping boards 71 clamp the handle universal joint 61 and the working universal joint 81 The fixing bolt 72 is inserted through and fixed on the clamping boards 71, such that an interval between the clamping boards 71 is fixed, and the clamping boards 71 can clamp the handle 60 and the working unit 80 firmly.

To replace the working unit 80 with a new one, the fixing bolt 72 needs to be loosened since the fixing bolt 72 is fixed on the clamping boards 71. After the fixing bolt 72 is detached from the clamping boards 71, the clamping boards 71 are dissembled individually. Then, a new working unit is clamped by the clamping boards 71, and the fixing bolt 72 is inserted through the clamping boards 71 to fix the clamping boards 71. The new working unit may be a magnet, such that a user can use the vehicle repair hand tool to attract an iron component in a narrow space of a vehicle.

However, the clamping boards 71 are arranged individually, so when the fixing bolt 72 is loosened, the clamping boards 71 are dissembled individually. Therefore, it is inconvenient for the user to replace the working unit 80.

SUMMARY OF THE INVENTION

The main objective of the present invention is to provide a vehicle repair hand tool to resolve the afore-mentioned problems.

The vehicle repair hand tool has a handle, a connecting rod, a connecting unit, and a working unit.

The connecting rod is connected with an end of the handle.

The connecting unit is connected with an end of the connecting rod at a position opposite to the handle and has a connector having an engagement hole formed in a side of the connector.

The working unit is connected with the connector and has a base, an engagement unit, and a working body. The base accommodates the connector and has a sliding recess formed in a side of the base and a recess opening formed in a bottom of the sliding recess. The engagement unit is mounted in the sliding recess and has a sliding block slidably mounted in the sliding recess. The engagement unit further has an engagement ball mounted in the recess opening, sheltered by the sliding block, and selectively engaged in the engagement hole. The working body is mounted on a side of the base.

Other objectives, advantages and novel features of the present invention will become more apparent from the following detailed description when taken in conjunction with the accompanying drawings.

BRIEF DESCRIPTION OF THE DRAWINGS

FIG. 4 is a partial cross sectional side view along line 4-4 in FIG. 2;

FIG. 4A is an enlarged side view of FIG. 4;

DETAILED DESCRIPTION OF PREFERRED EMBODIMENT

Figure 1:
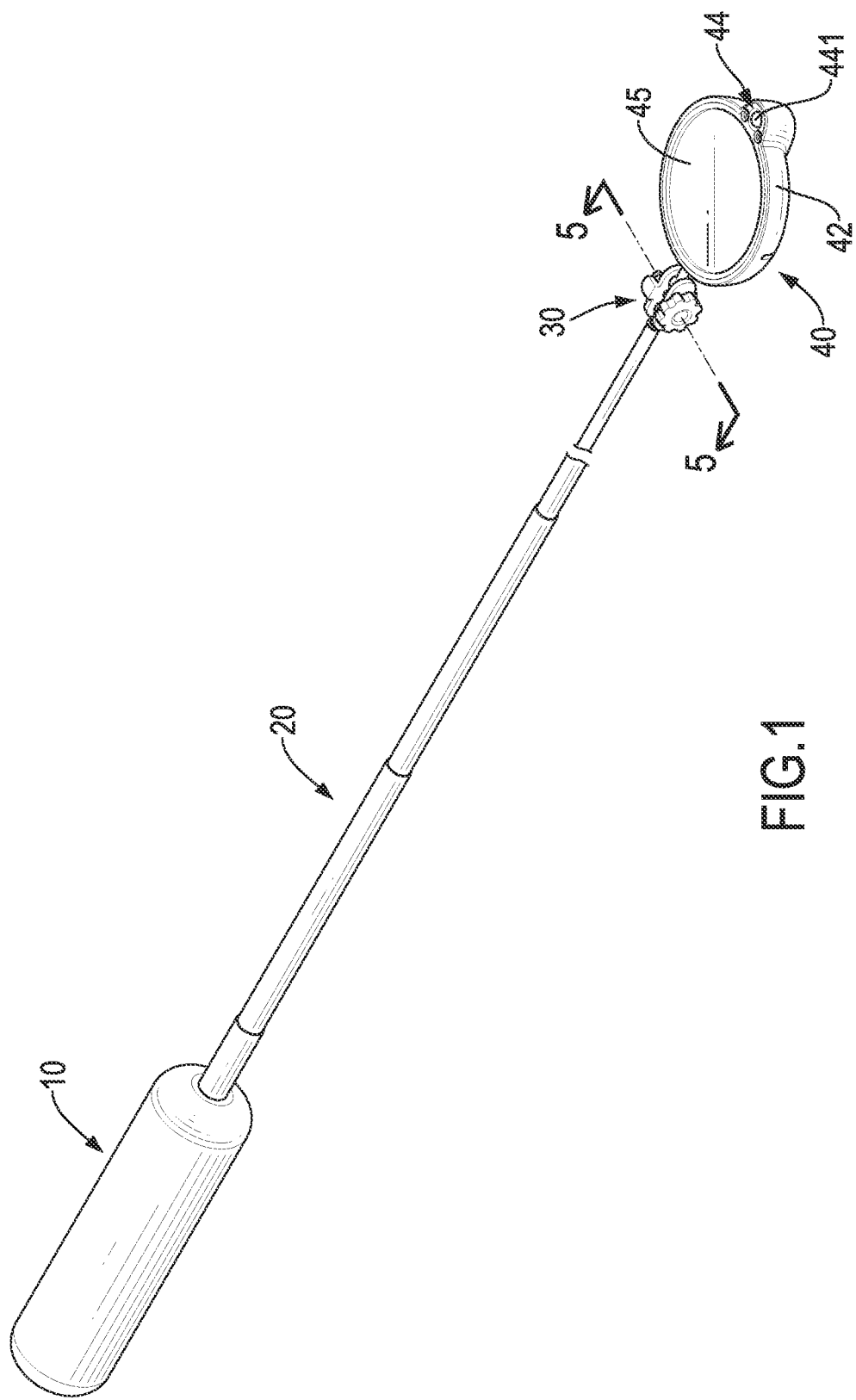
FIG. 1 is a perspective view of a first preferred embodiment of a vehicle repair hand tool in accordance with the present invention.
Figure 2:
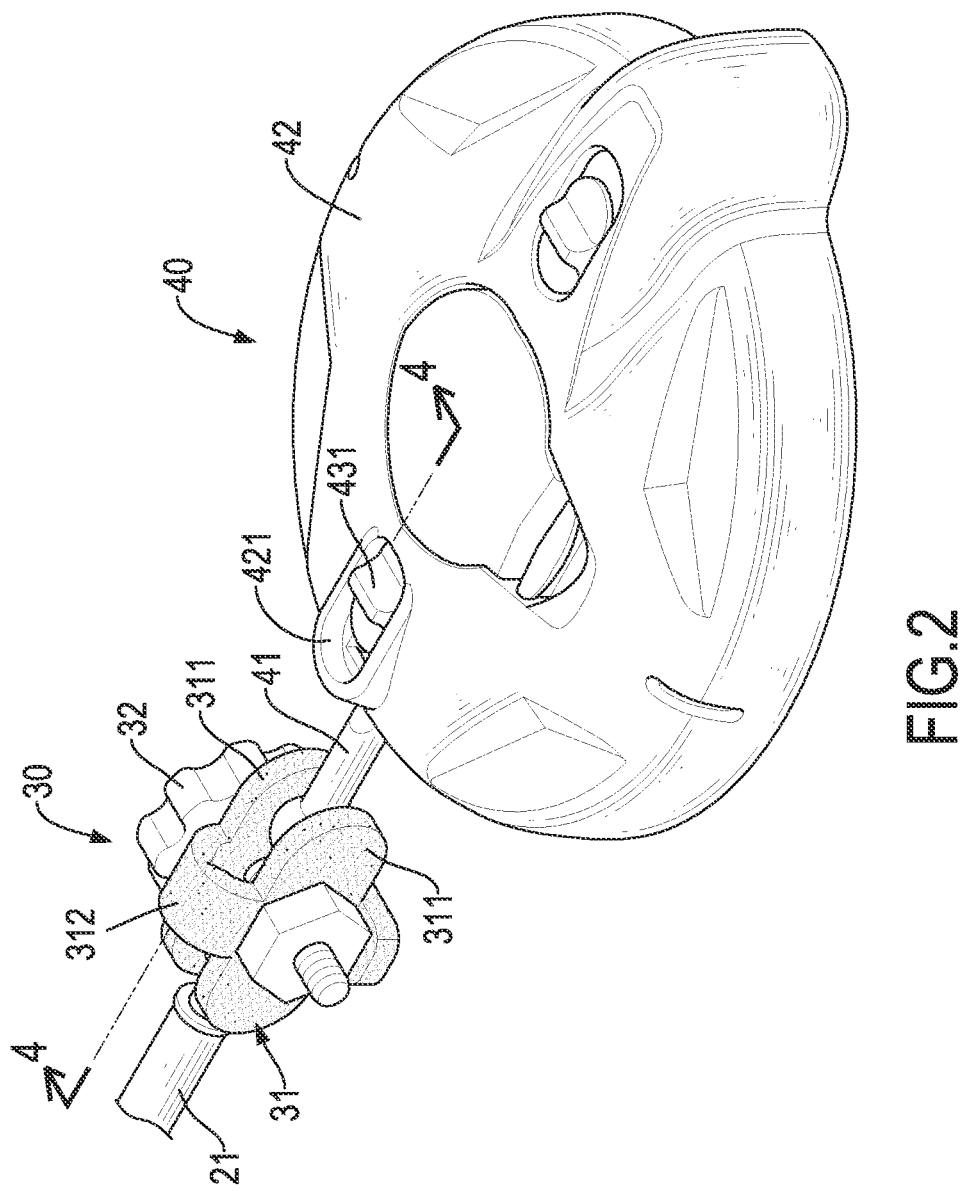
FIG. 2 is an enlarged perspective view of the vehicle repair hand tool in FIG. 1.
Figure 3:
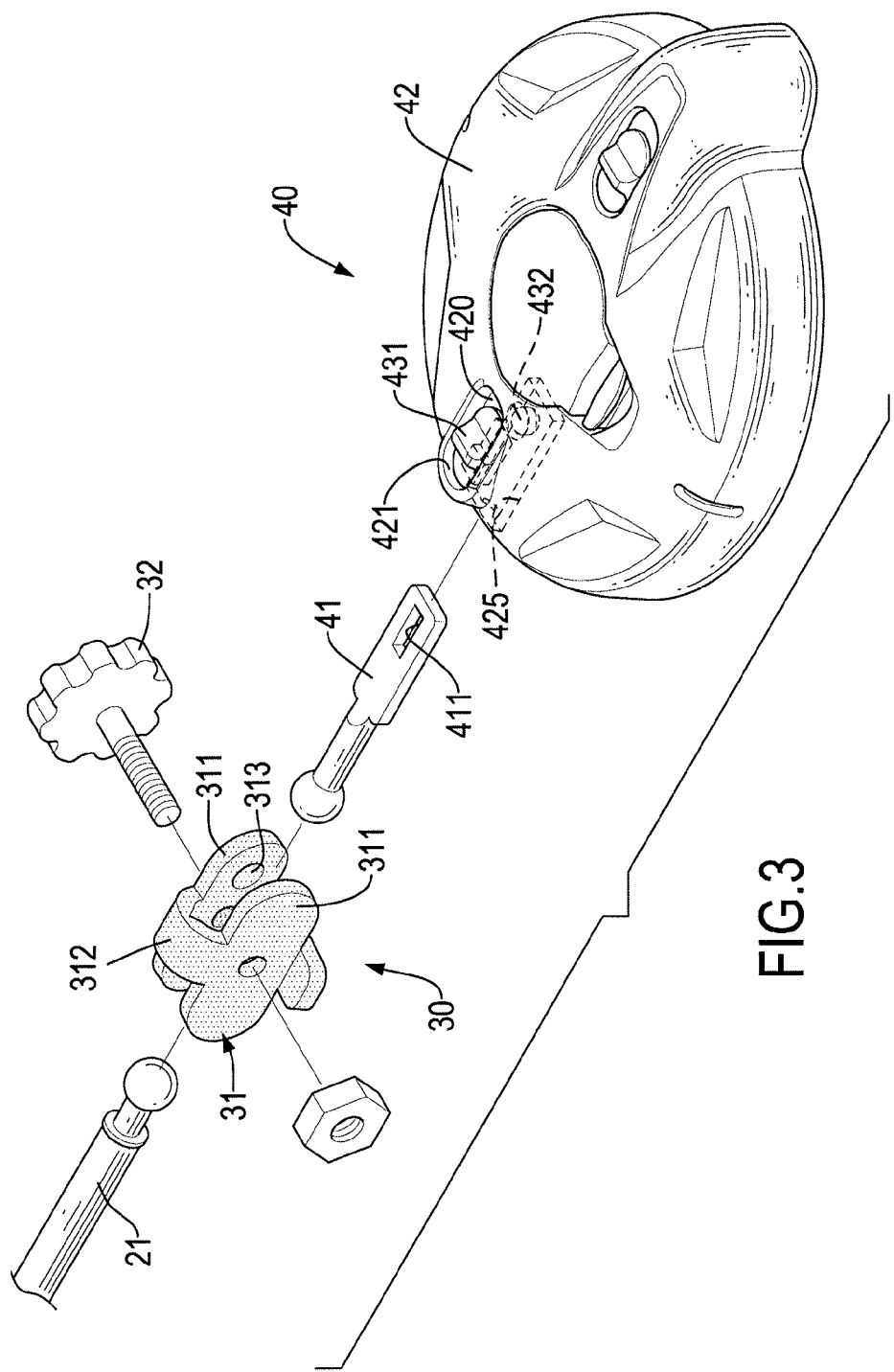
FIG. 3 is an enlarged and exploded perspective view of the vehicle repair hand tool in FIG. 1.
Figure 5:
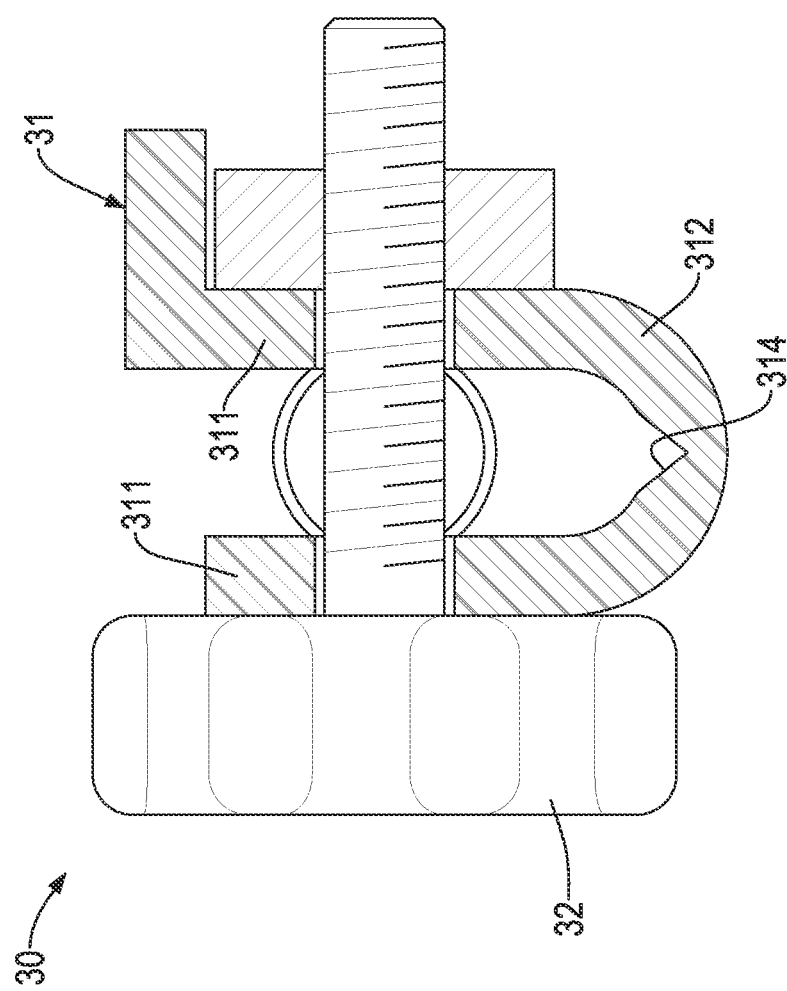
FIG. 5 is an enlarged front view in partial section of the vehicle repair hand tool in FIG. 1.

With reference to FIGS. 1 to 5, a first preferred embodiment of a vehicle repair hand tool in accordance with the present invention has a handle 10, a connecting rod 20, a connecting unit 30, and a working unit 40.

The connecting rod 20 is connected with an end of the handle 10. The connecting rod 20 is retractable and has a rod connector 21. Preferably, the rod connector 21 is a universal joint.

The connecting unit 30 is connected with an end of the connecting rod 20 opposite to the handle 10 and has a connecting base 31, a fixing unit 32 and a connector 41. The connecting base 31 is connected with an end of the rod connector 21 of the connecting rod 20 and has two clamping plates 311, a connecting board 312, two pairs of recesses 313, and a slit 314. The clamping plates 311 face each other. The connecting board 312 is curved and is connected between the clamping plates 311, such that the connecting base 31 has a U-shaped cross section. The pairs of recesses 313 are respectively formed in inner sides of the clamping plates 311, wherein the rod connector 21 is clamped by one pair of the recesses 313. The slit 314 is elongated and is formed in an inner side of the connecting board 312, such that a middle of the connecting board 312 has a relatively narrow thickness, and the clamping plates 311 can be forced to move away from each other easily. The fixing unit 32 is inserted through the clamping plates 311 to fix an interval between the clamping plates 311. The connector 41 may be a universal joint and is clamped by the clamping plates 311, wherein the connector 41 is clamped by the pair of the recesses 313 distal from the rod connector 21. The connector 41 has an engagement hole 411 formed in a side of the connector 41. Preferably, the engagement hole 411 is formed through the connector 41.

The working unit 40 is connected with the connecting unit 30 at a position opposite to the connecting rod 20 and has a base 42, an engagement unit 43, a light-emitting module 44, and a working body 45. The base 42 accommodates an end of the connector 41 opposite to the clamping plates 311 and has an inner space, a baffle 420, a sliding recess 421, a recess opening 422, a sliding hole 423, an inserting portion 424, an inserting slit 425 and a through hole 426. The baffle 420 is formed horizontally in the base 42 and divides the inner space into the sliding recess 421 and the recess opening 422. The sliding recess 421 is formed in a side of the base 42. The recess opening 422 is located below the sliding recess 421. The sliding hole 423 is formed through the baffle and communicates with the sliding recess 421 and the recess opening 422. A dimension of the sliding hole 423 is smaller than those of the sliding recess 421 and the recess opening 422. The inserting portion 424 is formed horizontally in the base 42 and is parallel to the baffle 420. The inserting slit 425 is formed horizontally through a side of the inserting portion 424 and is parallel to the recess opening 422. The shape of the inserting slit 425 corresponds to the shape of the connector 41. The through hole 426 is formed through the inserting portion 424 and communicates with the recess opening 422 and the inserting slit 425. The connector 41 is inserted into the inserting slit 425, and the engagement hole 411 is aligned to the through hole 426 of the base 42. The engagement unit 43 is mounted in the sliding recess 421 and has a sliding block 431 and an engagement ball 432. The sliding block 431 is slidably mounted in the sliding recess 421 and has a sliding slit 430, an abutting block 433, an abutting surface 434 and a pressing surface 435. The sliding slit is formed horizontally in the sliding block 431, wherein the baffle 420 of the base 42 is correspondingly inserted in the sliding slit. The sliding block 431 is slidably moved in the sliding hole along the baffle. The abutting block 433 is formed on a side of the sliding block 431 and extends into the sliding recess 421. The abutting surface 434 is formed on an end of the abutting block 433 and is inclined relative to the sliding recess 421. The pressing surface 435 is formed on the abutting block 433, faces toward the recess opening 422, and is connected with the abutting surface 434. The engagement ball 432 is mounted in the recess opening 422 and the through hole 426 in the base 42, is sheltered by the sliding block 431, and is selectively engaged in the inserting slit 425 and the engagement hole 411 of the connector 41. The light-emitting module 44 is mounted in the base 42 and has a light-emitting unit 441. The light-emitting unit 441 is exposed out of the base 42. The working body 45 is mounted on a side of the base 42. The working body 45 may be a mirror.

In use, when a user needs to detach a working part from a narrow slit of a vehicle, the user can insert the vehicle repair hand tool into the slit. The connecting rod 20 can be retracted or extended according to a demand of the user. The light-emitting module 44 can illuminate the working part by the light-emitting unit 441. Then, the user can check the situation of the working part by the working body 45.

Figure 6:
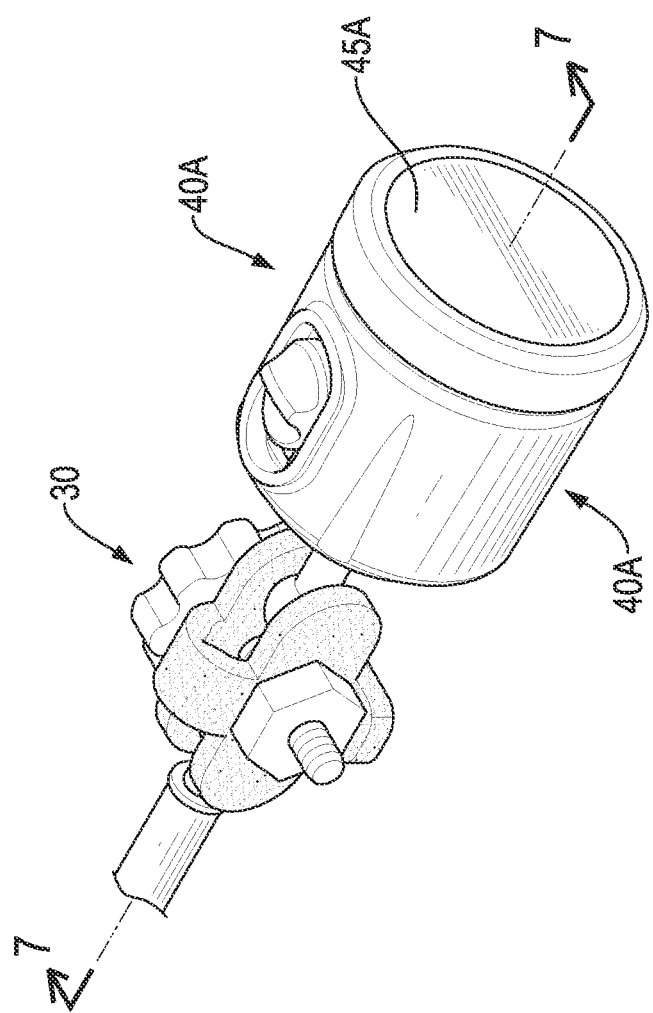
FIG. 6 is a perspective view of a second preferred embodiment of the vehicle repair hand tool in accordance with the present invention.
Figure 7:
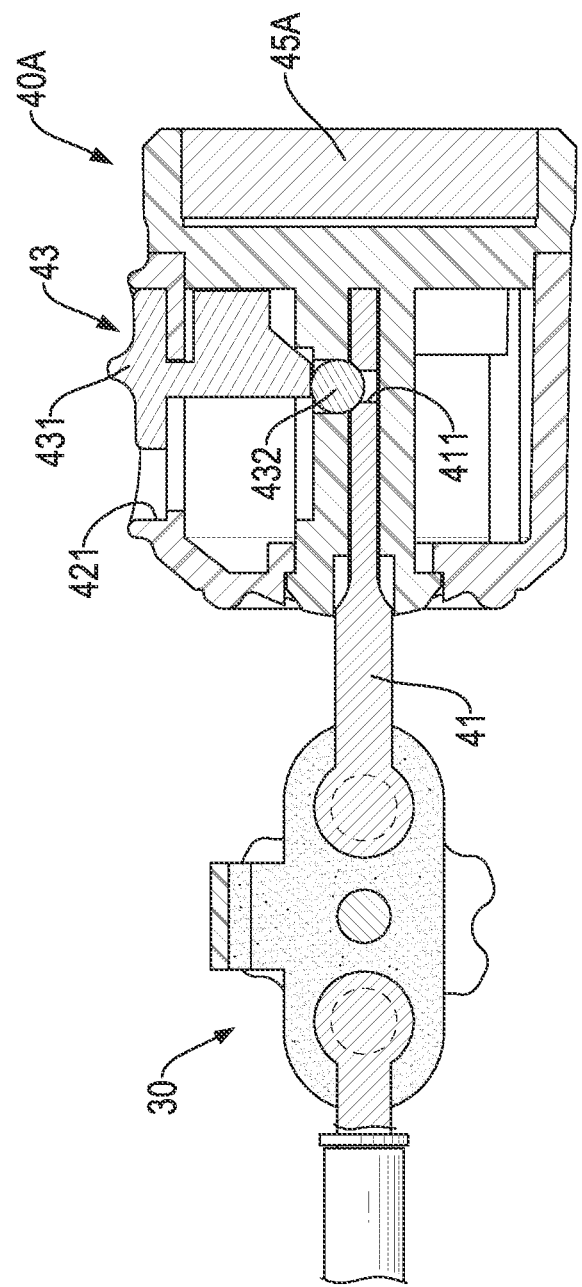
FIG. 7 is an enlarged cross sectional side view along line 7-7 in FIG. 6.
Figure 8:
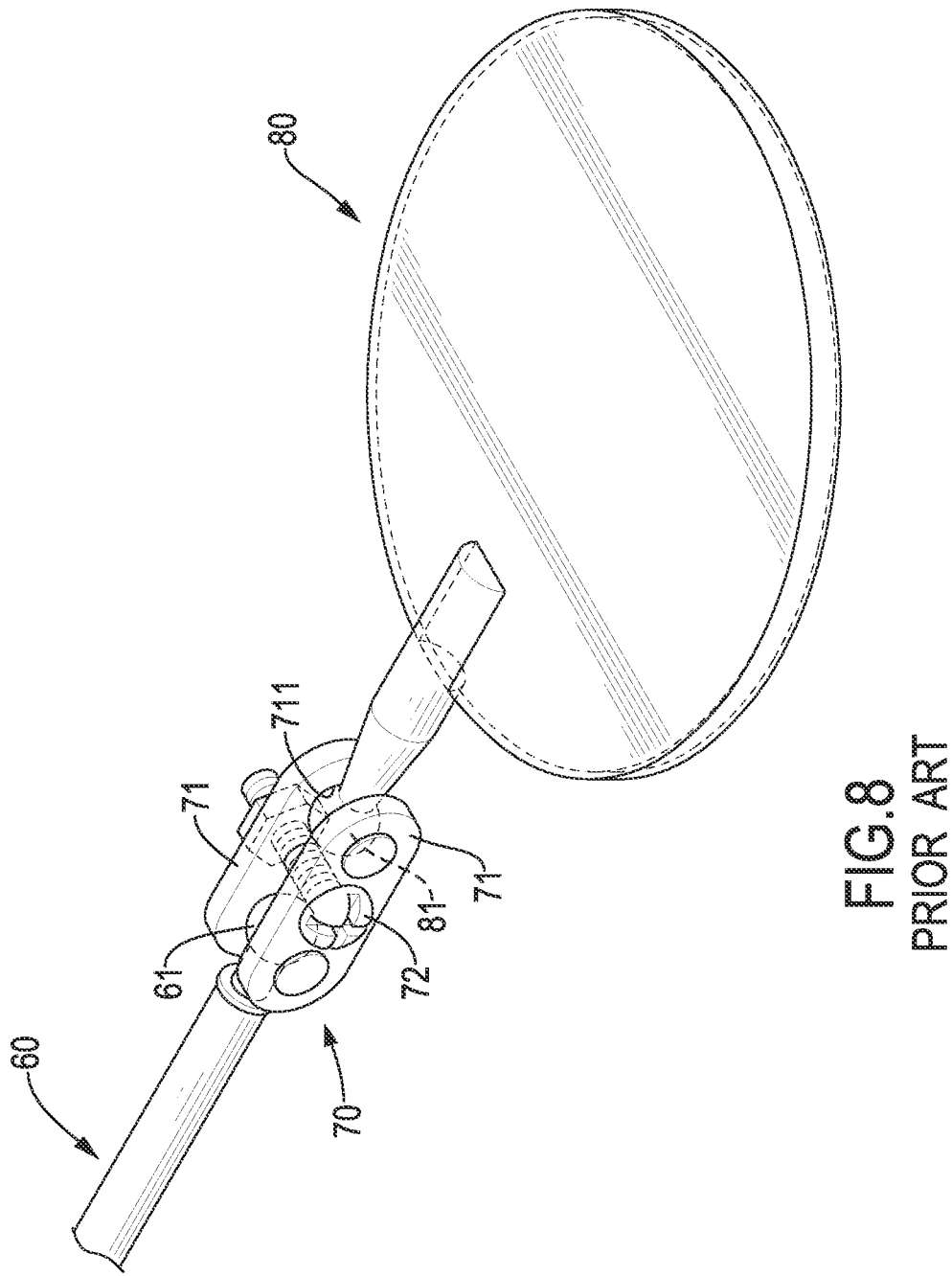
FIG. 8 is a partial perspective view of a conventional vehicle repair hand tool.

With reference to FIGS. 6 and 7, a second preferred embodiment of the vehicle repair hand tool in accordance with the present invention has a different working unit 40A. The working unit 40A has a working body 45A, which may be a magnet. In use, the vehicle repair hand tool can be inserted into a narrow slit to attract an iron component.

To replace the working unit 40, the sliding block 431 is slid first, such that the pressing surface 435 does not press against the engagement ball 432. Then, the engagement ball 432 can move away from the engagement hole 411, such that the connector 41 can be pulled out of the base 42. Then, another base 42 assembled with a different working body 45 can replace the original base 42.

When the new base 42 needs to be mounted on the connector 41, the connector 41 is first inserted into the new base 42. Then, the sliding block 431 is slid to push the engagement ball 432 by the abutting surface 434, such that the engagement ball 432 can be pushed into the recess opening 422 and the engagement hole 411. Therefore, the new base 42 can be mounted on the connector 41 firmly.

From the above description, it is noted that the present invention has the following advantages:

When the base 42 needs to be replaced with another one assembled with a different working body 45,45A, a replacing process of the vehicle repair hand tool is simple. First, the sliding block 431 is slid, such that the engagement ball 432 can be detached from the engagement hole 411, Then, the connector 41 can be pulled from the original base 42. The connector 41 is then inserted into the new base 42, and then the sliding block 431 is slid by the user. The sliding block 431 will push the engagement ball 432 to engage in the engagement hole 411. Therefore, the base 42 is connected with the connector 41 again.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle repair hand tool having:
   a handle;
   a connecting rod connected with an end of the handle;
   a connecting unit having
      a connecting base connected with an end of the connecting rod opposite to the handle and having two clamping plates, a connecting board connected between the clamping plates and a pair of recesses respectively formed in inner sides of the clamping plates;
      a fixing unit inserted through the clamping plates to fix an interval between the clamping plates; and
      a connector clamped by the pair of the recesses distal from the rod connector and having an engagement hole formed in a side of the connector; and
   a working unit connected with the connector and having
      a base accommodating the connector and having
         an inner space;
         a baffle formed horizontally in the base and dividing the inner space into a sliding recess formed in a side of the base;
         a recess opening formed in a bottom of the sliding recess; and
         a sliding hole formed through the baffle and communicating with the sliding recess and the recess opening, a dimension of the sliding hole being smaller than those of the sliding recess and the recess opening;
      an engagement unit mounted in the sliding recess and having
         a sliding block slidably mounted in the sliding recess and having
            a sliding slit formed horizontally in the sliding block, wherein the baffle of the base is correspondingly inserted in the sliding slit;
            an abutting block formed on a side of the sliding block and inserted into the sliding recess and the recess opening;
            an abutting surface inclined relative to the sliding recess and formed on an end of the abutting block; and
            a pressing surface formed on a side of the abutting block, facing toward the recess opening, and connected with the abutting surface; and
         an engagement ball mounted in the recess opening and the engagement hole, being movable between the recess opening and the engagement hole, sheltered by the sliding block, and selectively engaged in the engagement hole via being abutted by the pressing surface of the sliding block; and a working body mounted on a side of the base.

2. The vehicle repair hand tool as claimed in claim 1, wherein the working unit further has a light-emitting module mounted in the base and having a light-emitting unit exposed out of the base.

3. The vehicle repair hand tool as claimed in claim 2, wherein the connecting rod is retractable.

4. The vehicle repair hand tool as claimed in claim 1, wherein the working body is a mirror.

5. The vehicle repair hand tool as claimed in claim 2, wherein the working body is a mirror.

6. The vehicle repair hand tool as claimed in claim 3, wherein the working body is a mirror.

7. The vehicle repair hand tool as claimed in claim 1, wherein the working body is a magnet.

8. The vehicle repair hand tool as claimed in claim 2, wherein the working body is a magnet.

9. The vehicle repair hand tool as claimed in claim 3, wherein the working body is a magnet.

10. The vehicle repair hand tool as claimed in claim 1, wherein the base further has
    an inserting portion formed horizontally in the base and being parallel with the baffle,
    an inserting slit formed horizontally through a side of the inserting portion and being parallel with the recess opening, and
    a through hole formed through the inserting portion and communicating with the recess opening and the inserting slit; and
    the connector is inserted into the inserting slit, and the engagement hole is selectively aligned with the through hole of the base.

\* \* \* \* \*